(12) United States Patent
Gong et al.

(10) Patent No.: US 6,587,115 B2
(45) Date of Patent: Jul. 1, 2003

(54) METHOD OF AN APPARATUS FOR DISTINGUISHING TYPE OF PIXEL

(75) Inventors: Weidong Gong, Ibaraki-ken (JP); Masato Nakajima, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 292 days.

(21) Appl. No.: 09/789,630

(22) Filed: Feb. 22, 2001

(65) Prior Publication Data

US 2001/0020949 A1 Sep. 13, 2001

(30) Foreign Application Priority Data

Feb. 22, 2000 (JP) .................................. 2000-043841

(51) Int. Cl.⁷ .............................................. G09G 5/02
(52) U.S. Cl. ..................... 345/596; 382/173; 382/174
(58) Field of Search ................................ 345/581, 582, 345/596, 613; 382/173, 174, 168, 169

(56) References Cited

U.S. PATENT DOCUMENTS 5,987,221 A * 11/1999 Bearss et al. ............... 382/176
6,167,154 A * 12/2000 Renaud et al. .............. 382/174
6,167,166 A * 12/2000 Loce et al. .................. 382/266

FOREIGN PATENT DOCUMENTS

JP          05-114045 A       5/1993

* cited by examiner

Primary Examiner—Matthew Luu
(74) Attorney, Agent, or Firm—Nixon Peabody LLP; Donald R. Studebaker (57) ABSTRACT

The types of pixels of an image made up of a plurality of pixels arranged in a main scanning direction and a sub-scanning direction are distinguished. The image is divided into a plurality of blocks each substantially larger than a visually distinguishable size, properties of the images in the blocks representing the probability that the image is a binary image are detected, probability that the image in each block is a binary image is determined on the basis of the detected properties of the image in the block, and the blocks are divided into a binary image block, a tone image block, and an indeterminate image block according to the probability that the image is a binary image. The pixels in the blocks which are determined to be a binary image block are all determined to be pixels of a binary image while the pixels in the blocks which are determined to be a tone image block are all determined to be pixels of a tone image. Then a pixel-by-pixel determination is carried out on the blocks, which are determined to be an indeterminate image block by the block-by-block determination, in which properties of each of the pixels in each of the indeterminate blocks representing the probability that the pixel is of a binary image are detected, and whether the pixel is a pixel of a binary image is determined on the basis of the detected properties.

6 Claims, 7 Drawing Sheets

|  |  |  |
|---|---|---|
| 1 | 0 | -1 |
| 1 | 0 | -1 |
| 1 | 0 | -1 |

FIG.3A

|  |  |  |
|---|---|---|
| 1 | 1 | 1 |
| 0 | 0 | 0 |
| -1 | -1 | -1 |

FIG.3B

|  |  |  |
|---|---|---|
| 0 | -1 | -1 |
| 1 | 0 | -1 |
| 1 | 1 | 0 |

FIG.3C

|  |  |  |
|---|---|---|
| 1 | 1 | 0 |
| 1 | 0 | -1 |
| 0 | -1 | -1 |

FIG.3D

|    |    |    |    |    |
|----|----|----|----|----|
| -1 | -1 | -1 | -1 | -1 |
| 0  | 0  | 0  | 0  | 0  |
| 2  | 2  | 2  | 2  | 2  |
| 0  | 0  | 0  | 0  | 0  |
| -1 | -1 | -1 | -1 | -1 |

FIG.5A

|    |   |   |   |    |
|----|---|---|---|----|
| -1 | 0 | 2 | 0 | -1 |
| -1 | 0 | 2 | 0 | -1 |
| -1 | 0 | 2 | 0 | -1 |
| -1 | 0 | 2 | 0 | -1 |
| -1 | 0 | 0 | 0 | -1 |

METHOD OF AN APPARATUS FOR DISTINGUISHING TYPE OF PIXEL

BACKGROUND OF THE INVENTION

1. Field of the Invention

This invention relates to a method of an apparatus for distinguishing the types of pixels making up an original, and more particularly to a method of and an apparatus for distinguishing the types of pixels making up an original, which are used, for instance, in a stencil printer which makes a stencil by image wise perforating a heat-sensitive stencil material and a print is made from the stencil, and a copier or a printer in which a latent image is formed on a photosensitive medium by electrophotography or the like and a toner image obtained by developing the latent image is transferred to a printing paper or a heat-sensitive paper.

2. Description of the Related Art

In the fields of plate making and printing, there has been put into practice a process in which an original, in which binary images such as a line drawing and characters and tone images such as a picture and halftone dots mingle together (such an original will be referred to as a "complex original", hereinbelow), is read by an image scanner, a multivalued image signal sampled in a main scanning direction and a sub-scanning direction pixel by pixel is obtained, the multivalued image signal is converted into a binary image signal, and a plate or a print is made from the binary image signal.

In order to obtain a desirable output when a complex original is output through an image processing apparatus, generally, the region of the binary image is subjected to a binary image density conversion in which the density of each pixel is converted to a maximum density or a minimum density on the basis of a single threshold value, the region of the tone image is subjected to a tone image density conversion in which the density of each pixel is converted taking into account the properties of the input/output system so that the tone properties of the original image are preserved, and then the region of the binary image is binary-coded by a simple binary-coding method using a single threshold value while the region of the tone image is binary-coded by a pseudo-halftone expressing method such as a dither method and an error diffusion method. The density conversion is carried out on the basis of a density conversion curve (function) and/or LUT (lookup table) exclusive to the type of the image. That is, a density conversion curve and/or LUT exclusive to the binary image are used for density conversion of the region of the binary image and a density conversion curve and/or LUT exclusive to the tone image are used for density conversion of the region of the tone image.

Accordingly, it is necessary to determine the type of each region, that is, to distinguish the binary image region from the tone image region. In other words, it is necessary to distinguish the type of each pixel (the type of image which the pixel makes up) in order to determine the density conversion curve and/or the LUT according to which the density conversion is to be carried out on the pixel. There have been proposed various methods of distinguishing the binary image region and the tone image region from each other.

For example, in Japanese Unexamined Patent Publication No. 5(1993)-114045, a method of distinguishing the types of images in which an original image is divided into a plurality of blocks each including m×n pixels, properties of the image in each block are detected, and determining which of a binary image, a tone image and a blank (background), the image in each block is on the basis of the properties detected, with the result of the determination being corrected, if necessary, taking into account the properties of the images in blocks near the block.

However, the method gives rise to a problem that when each block is set in a size larger than such a size that the properties of the image therein can be visually determined (will be referred to as "the visually distinguishable size", hereinbelow), there is a fear that both a region of characters and a region of a picture exist in one block (such a block will be referred to as "a complex block", hereinbelow). That is, since the image even in a complex block must be determined to be a binary image or a tone image, the result of the determination is inherently partly true and partly not true.

When a density conversion is carried out on pixels in each block on the basis of the result of the determination, the picture region is output to be higher in density when the block is determined to be a binary image block, since a density conversion is carried out on a picture image region by use of the density conversion curve exclusive to the binary image. Conversely, if the block is determined to be a tone image block, the character region is output to be lower in density as compared with when the density conversion is carried out by use of the density conversion curve exclusive to the tone image.

To the contrast when the block is set in a size smaller than the "visually distinguishable size", it becomes difficult to determine whether an image in each block is a part of a thick character or a high density portion of a picture. Also in this case, the image in each block must be determined to be a binary image or a tone image, the result of the determination is inherently partly true and partly not true.

When a density conversion is carried out on pixels in each block on the basis of the result of the determination, the picture region is output to be higher in density when the block is determined to be a binary image block, since a density conversion is carried out on a picture image region by use of the density conversion curve exclusive to the binary image. Conversely, if the block is determined to be a tone image block, the character region is output to be lower in density as compared with when the density conversion is carried out by use of the density conversion curve exclusive to the tone image.

If the densities of pixels are output to be higher or lower than a correct density due to wrong determination, a density step is generated between a part correctly determined and a part incorrectly determined and the observer feels strange.

SUMMARY OF THE INVENTION

In view of the foregoing observations and description, the primary object of the present invention is to provide a method and an apparatus which can distinguish more precisely the binary image region and the tone image region (can more precisely distinguish the types of pixels) in a complex original, in which binary images and tone images mingle together.

In accordance with the present invention, the original image is divided into a plurality of blocks each being not smaller than "the visually distinguishable size" and the kind of the image in each block is determined on the basis of the properties of the block. The pixels in the block which can be readily determined to be a binary image block by the "block-by-block" determination are all determined to be pixels of a binary image (that is, the pixels are of a binary image type), and, for example, are subjected to density conversion according to the density conversion curve exclusive to the binary image. Similarly, the pixels in the block which can be readily determined to be a tone image block by the "block-by-block" determination are all determined to be pixels of a tone image (that is, the pixels are of a tone image type), and for example, are subjected to density conversion according to the density conversion curve exclusive to the tone image. On the other hand, the types of pixels in the block which cannot be readily determined to be a binary image block or a tone image block by the "block-by-block" determination (will be referred to as "an indeterminate image block", hereinbelow) are determined pixel by pixel.

That is, in accordance with a first aspect of the present invention, there is provided a method of distinguishing the types of pixels of an image made up of a plurality of pixels arranged in a main scanning direction and a sub-scanning direction comprising the steps of carrying out a block-by-block determination in which the image is divided into a plurality of blocks each substantially larger than a visually distinguishable size, properties of the images in the blocks representing the probability that the image is a binary image are detected, probability that the image in each block is a binary image is determined on the basis of the detected properties of the image in the block, each block is determined to be a binary image block when the probability is higher than a first predetermined value, to be a tone image block when the probability is lower than a second predetermined value, and to be an indeterminate image block when the probability is not higher than the first predetermined value and not lower than the second predetermined value, and the pixels in the blocks which are determined to be a binary image block are all determined to be pixels of a binary image while the pixels in the blocks which are determined to be a tone image block are all determined to be pixels of a tone image, and carrying out a pixel-by-pixel determination on the blocks, which are determined to be an indeterminate image block by the block-by-block determination, in which properties of each of the pixels in each of the indeterminate blocks representing the probability that the pixel is of a binary image are detected, and whether the pixel is a pixel of a binary image is determined on the basis of the detected properties.

For example, the pixels which are determined to be those of a binary image in the pixel-by-pixel determination are subjected to density conversion according to the density conversion curve exclusive to the binary image. The pixels which are not determined to be those of a binary image in the pixel-by-pixel determination may be considered to be those of a tone image, and for example, are subjected to density conversion according to the density conversion curve exclusive to the tone image.

The size of the blocks should be not smaller than the visually distinguishable size so that whether the image in each block is a part of a thick character or a high density part of a picture can be readily determined and whether the image in each block is a part of an edge of a character or a part of an edge of a picture can be readily determined. For example, the size of the blocks maybe substantially equal to the visually distinguishable size, e.g., 1 cm×1 cm as measured on the original.

The probability that an image is a binary image is correlative to the probability that the image is a tone image. That is, as the probability that an image is a binary image increases, the probability that the image is a tone image decreases, and as the probability that an image is a tone image increases, the probability that the image is a binary image decreases. Accordingly, determining the probability that an image is a binary image is equivalent to determining the probability that an image is a binary image. That is, in the present invention properties of the images in the blocks representing the probability that the image is a binary image may be detected by detecting properties of the images in the blocks representing the probability that the image is a tone image.

It is preferred that properties of the image in each block representing the probability that the image is a binary image is detected by calculating a characteristic value for the block. For example, edge pixels (pixels which are high in probability of being a part of an edge) may be detected on the basis of change in density of the pixels in the block and the proportion of the edge pixels in the block may be calculated. Otherwise, the proportion of white pixels having a density lower than the density of the background may be calculated on the basis of a density distribution diagram (e.g., a density histogram whose abscissa and ordinate respectively represent the density and the frequency at which pixels having the density appear), the central value of the range of the values (densities) of pixels (e.g., the mid-value, the mean value or the median) may be calculated or the width of the range of the values of pixels may be calculated.

"Which of the binary image, the tone image and the indeterminate image, the image in each block is" is determined on the basis of the characteristic values by the use of, for instance, an LUT method or a fuzzy theory. When characteristic values calculated from both the viewpoints of the density change in the block and the density distribution in the block are used, the distinguishing accuracy can be higher than when characteristic values calculated from a single viewpoint are used.

It is preferred that the properties of each of the pixels representing the probability that the pixel is of a binary image include at least one of information on the probability that the pixel represents a high density, information on the probability that the pixel is of a thin line drawing, information on sharpness of an edge and information on the probability that the pixel is of an edge so that pixels of a larger number of types of binary image can be distinguished. For example, whether or not each pixel is a pixel representing a high density, whether or not each pixel is of a thin line drawing, whether or not each pixel is of an edge may be determined according to the densities of adjacent pixels, and the result of the determination may be output as a signal representing the probability that the pixel is of a binary image. Then whether each pixel in the blocks which are determined to be an indeterminate block is of a binary image is determined on the basis of the signal by the use of, for instance, an LUT method or a fuzzy theory.

It is preferred that on which level between the tone image and the binary image each of the blocks which are determined to be an indeterminate image block is (this level will be referred to as the "image level", hereinbelow) be determined on the basis of said properties of the image in the block representing the probability that the image is a binary image and each of the pixels in the block which are not determined to be of a binary image out of the pixels in the blocks which are determined to be an indeterminate image block (such a pixel will be referred to as a "non-binary pixel in an indeterminate image block" hereinbelow) be considered to be on the image level equal to the image level of the block. It is further preferred that on which level between the tone image and the binary image each of the non-binary pixels in an indeterminate image block is be determined on the basis of properties of the pixel representing the probability that the pixel is of a binary image.

In the case where the image levels of the non-binary pixels in an indeterminate image block are determined in the manner described above, for instance, the non-binary pixels in an indeterminate image block may be subjected to density conversion according to the density conversion curve which has been set exclusively to the image level.

On which level between the tone image and the binary image, each of the non-binary pixels in an indeterminate image block is need not be determined on the basis of the same properties and/or the same reference as those on the basis of which whether the pixel is a pixel of a binary image is determined. For example, the basis for the latter determination may be less strict than that for the former determination.

In accordance with a second aspect of the present invention, there is provided an apparatus for carrying out the method of the first aspect for distinguishing the types of pixels of an image made up of a plurality of pixels arranged in a main scanning direction and a sub-scanning direction comprising a block-by-block determination means which carries out a block-by-block determination in which the image is divided into a plurality of blocks each substantially larger than a visually distinguishable size, properties of the images in the blocks representing the probability that the image is a binary image are detected, probability that the image in each block is a binary image is determined on the basis of the detected properties of the image in the block, each block is determined to be a binary image block when the probability is higher than a first predetermined value, to be a tone image block when the probability is lower than a second predetermined value, and to be an indeterminate image block when the probability is not higher than the first predetermined value and not lower than the second predetermined value, and the pixels in the blocks which are determined to be a binary image block are all determined to be pixels of a binary image while the pixels in the blocks which are determined to be a tone image block are all determined to be pixels of a tone image, and a pixel-by-pixel determination means which carries out a pixel-by-pixel determination on the blocks, which are determined to be an indeterminate image block by the block-by-block determination, in which properties of each of the pixels in each of the indeterminate blocks representing the probability that the pixel is of a binary image are detected, and whether the pixel is a pixel of a binary image is determined on the basis of the detected properties.

It is preferred that the block-by-block determination means determines on which image level between the tone image and the binary image each of the blocks which are determined to be an indeterminate image block is on the basis of said properties of the image in the block representing the probability that the image is a binary image, and the pixel-by-pixel determination means determines each of the pixels in the block which are not determined to be of a binary image out of the pixels in the blocks which are determined to be an indeterminate image block to be on the image level equal to the image level of the block.

It is further preferred that the pixel-by-pixel determination means determines on which level between the tone image and the binary image each of the non-binary pixels in an indeterminate image block is on the basis of properties of the pixel representing the probability that the pixel is of a binary image.

In accordance with the present invention, blocks which are made up of both pixels of a character and pixels of a picture and cannot be determined to be a character block or a picture block are determined to be indeterminate blocks, and at least the pixels in the blocks determined to be an indeterminate blocks are determined to be of a character or of a picture pixel by pixel. Thus, the types of pixels in the blocks in which binary images and tone images mingle together and which cannot be simply determined to be a binary image block or a tone image block by the "block-by-block" determination can be precisely determined. Further since each block is larger than the visually distinguishable size, whether an image in each block is a part of a thick character or a high density portion of a picture can be readily determined.

Thus in accordance with the present invention, the binary image region and the tone image region can be more precisely distinguished from each other, and accordingly, when the image signal is subjected to density conversion, the density of each pixel can be more adequately converted and an image free from the drawbacks inherent to the conventional method, that is, densities of pixels are output to be higher or lower than a correct density due to wrong determination, and a density step is generated between a part correctly determined and a part incorrectly determined, which makes the observer to feel strange.

When the image level of the blocks which are determined to be an indeterminate image block is determined, even if wrong determination occurs due to coexistence of pixels of a thick character and pixels of a high density part of a picture or pixels of an edge portion of a character and pixels of a part of a picture like an edge in one block, the density step generated due to the wrong determination can be lowered.

DESCRIPTION OF THE PREFERRED EMBODIMENT

Figure 1:
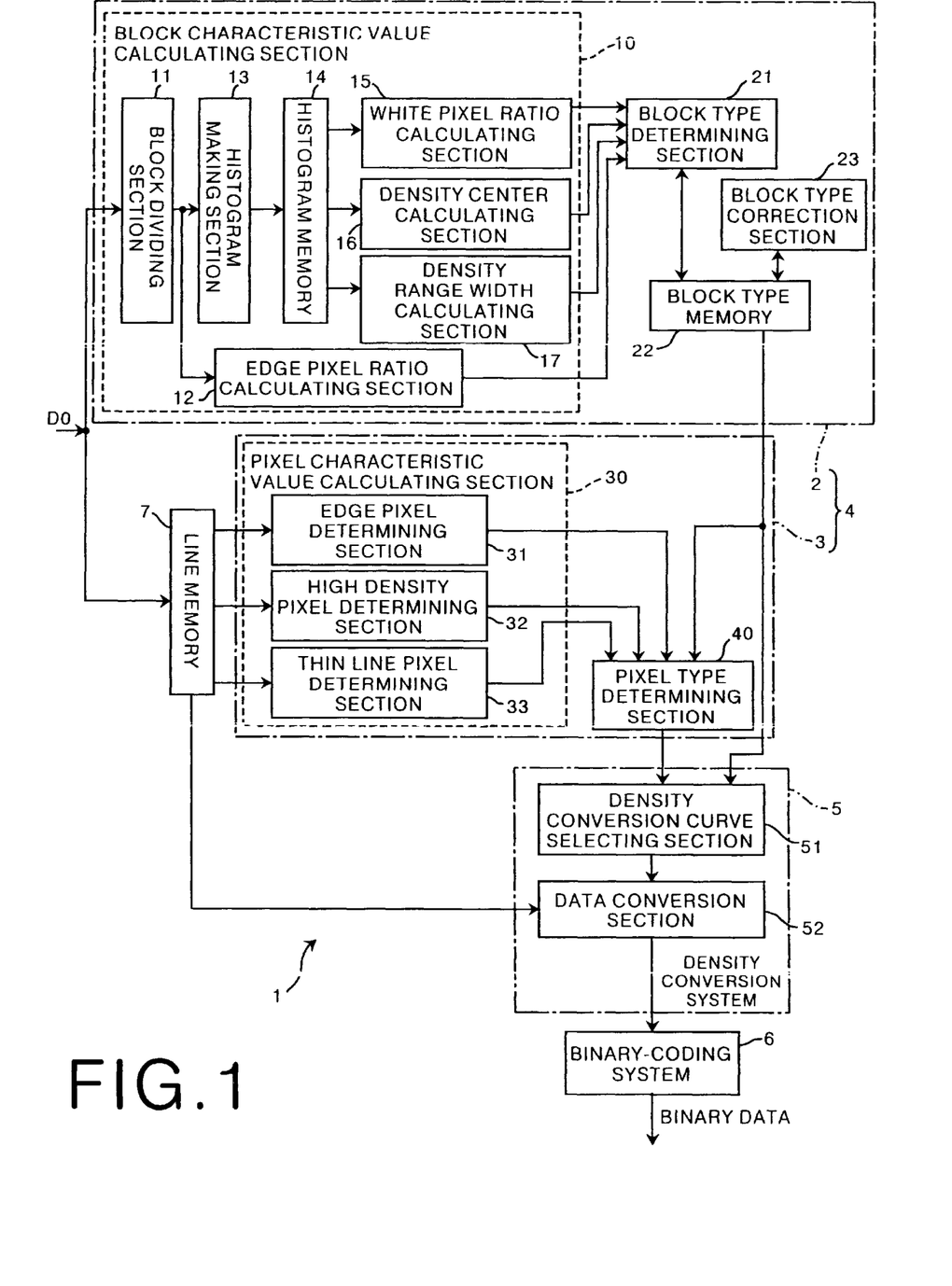
FIG. 1 is a block diagram showing an image processing apparatus provided with an apparatus for distinguishing the types of pixels making up an original in accordance with an embodiment of the present invention.

In FIG. 1, an image processing apparatus 1 provided with an apparatus 4 for distinguishing the types of pixels making up an original in accordance with an embodiment of the present invention comprises a block-by-block determination system 2, a pixel-by-pixel determination system 3, a density conversion system 5, a binary-coding system 6 and a line memory 7. The block-by-block determination system 2 and the pixel-by-pixel determination system 3 form the apparatus 4 for distinguishing the types of pixels making up an original in accordance with an embodiment of the present invention.

The block-by-block determination system 2 comprises a block characteristic value calculating section 10, a block type determining section 21, a block type memory 22 and a block type correction section 23. The pixel-by-pixel determination system 3 comprises a pixel characteristic value calculating section 30 and a pixel type determining section 40. The density conversion system 5 comprises a density conversion curve selecting section 51 and a data conversion section 52.

The block characteristic value calculating section 10 comprises a block dividing section 11, an edge pixel ratio calculating section 12, a histogram making section 13, a histogram memory 14, a white pixel ratio calculating section 15, a density center calculating section 16 and a density range calculating section 17.

The pixel characteristic value calculating section 30 comprises an edge pixel determining section 31, a high density pixel determining section 32 and a thin line pixel determining section 33.

The image processing apparatus 1 can operate in various ways. An operation of the image processing apparatus 1 for carrying out a method in accordance with a first embodiment of the present invention will be described, hereinbelow. In an original read-out means (not shown), light is projected onto an original, reflecting light from the original is converted to an electric signal representing image densities by a line sensor such as a CCD, and the electric signal is digitized to obtain a digital multi valued image signal DO. In the following description, the minimum value of image data which can be handled is represented by "0" and the maximum value of image data which can be handled is represented by "100" irrespective of the bit resolution (number of tones) used when the electric signal is digitized.

The image signal DO is input into the line memory 7 and the block characteristic value calculating section 10. In the following description, it is assumed that the original is a complex original where characters (a binary image) and a picture (a tone image) mingle together.

1 Block-by-Block Determination

Figure 2:
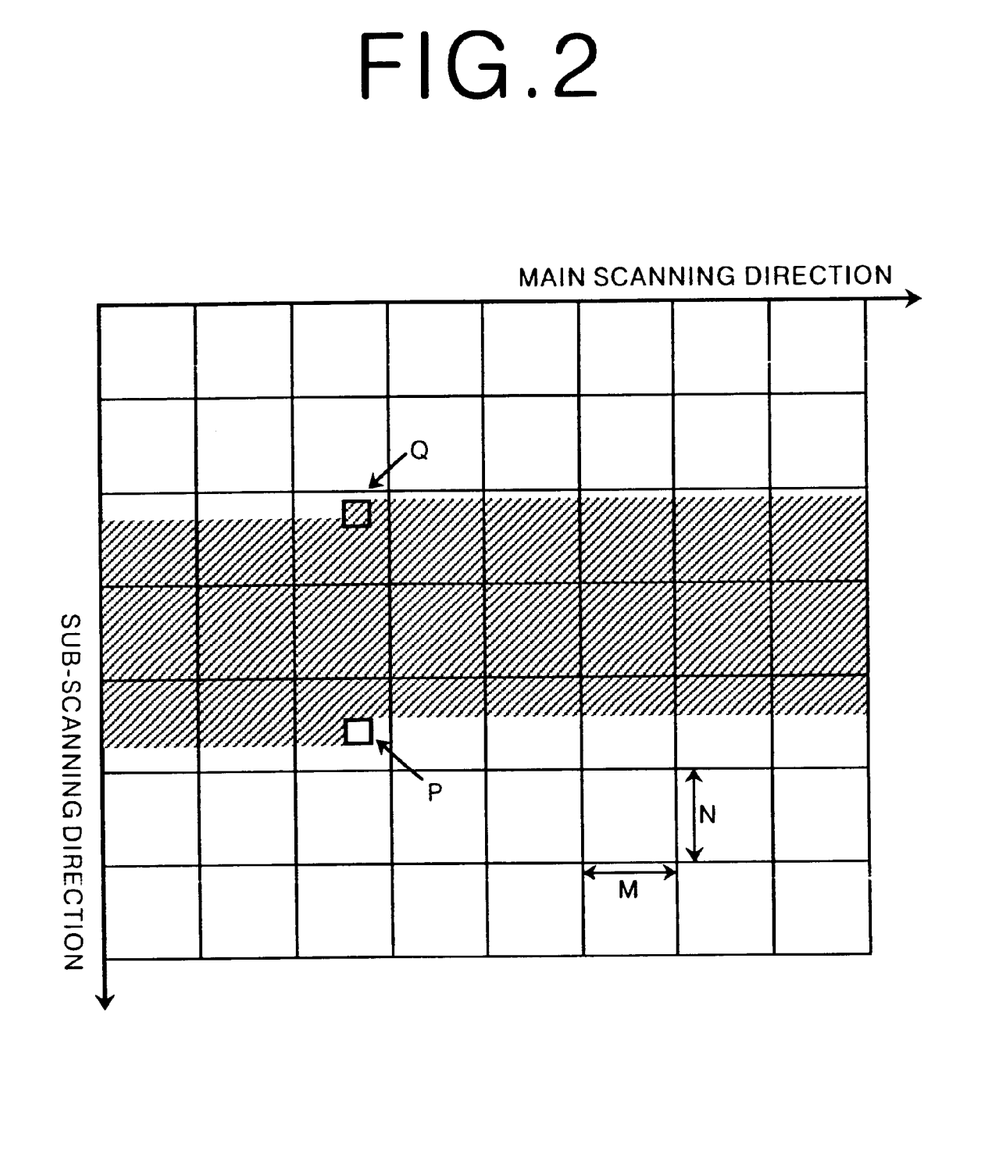
FIG. 2 is a view showing a state in which an original image is divided into a plurality of blocks.
Figure 3A:
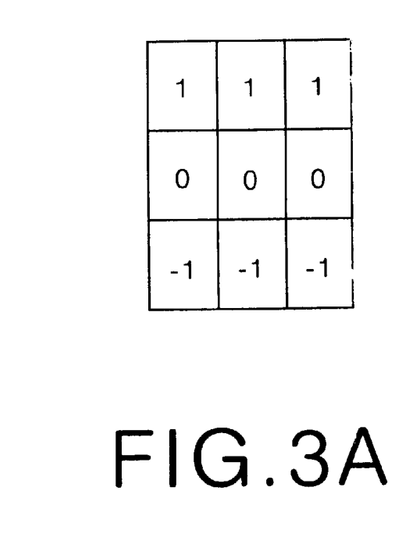
FIGS. 3A to 3D are views showing examples of edge detecting coefficient matrices.
Figure 3B:
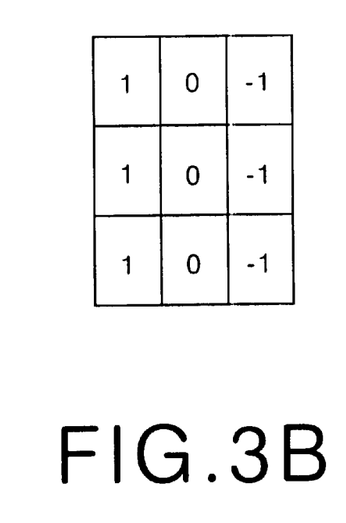
Figure 3C:
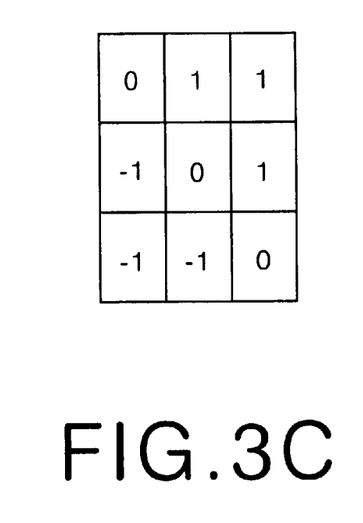
Figure 3D:
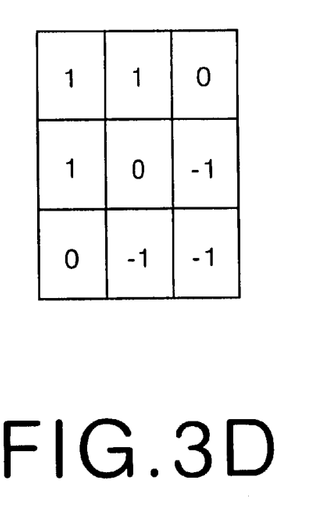

The block-by-block determination by the block-by-block determination system 2 will be described first. The image signal DO input into the block characteristic value calculating section 10 is divided by the block dividing section 11 into a plurality of blocks in such a size that the type of image in the block can be visually distinguished as shown in FIG. 2. Each block comprises M (in the main scanning direction) ×N (in the sub-scanning direction) pixels. Preferably each block is about 1 cm×1 cm in size.

Then the edge pixel ratio calculating section 12 carries out convolution of each 3×3 matrix comprising each pixel in each block and eight pixels around the pixel and each of a longitudinal edge detecting coefficient matrix, a lateral edge detecting coefficient matrix, a left and upward edge detecting coefficient matrix and a right and upward edge detecting coefficient matrix respectively shown in FIGS. 3A to 3D. When the largest of the absolute values of four values obtained by the operation for each pixel is not smaller than a threshold value T1 for determining an edge pixel, the pixel is determined to be an edge pixel. The threshold value T1 is set so that only an edge which hardly appears in a tone image can be detected. Then the edge pixel ratio calculating section 12 counts the number of the pixels which are determined to be an edge pixel and calculates the ratio of the number of the edge pixels to the number of all the pixels in the block (M×N) but white pixels (pixels having a density lower than the density Ts of the background), i.e., the edge pixel ratio $EP_R$ (%). Thereafter, the edge pixel ratio calculating section 12 compares the edge pixel ratio $EP_R$ for each block with first to third edge pixel ratio classifying threshold values $T_{e1}$, $T_{e2}$ and $T_{e3}$ ($T_{e1}<T_{e2}<T_{e3}$), and classifies the edge pixel ratio for each block into four classes, "0", "LOW", "MIDDLE" and "HIGH" according to the following table 1. The first to third edge pixel ratio classifying threshold values $T_{e1}$, $T_{e2}$ and $T_{e3}$ are set so that a part of a picture which is uniform in density is classified into "0", a part of a picture which is relatively less in fluctuation in density is classified into "LOW", a large character such as of a title is classified into "MIDDLE" and a character in a text is classified into "HIGH".

TABLE 1

| | |
|---|---|
| $0\% \leq EP_R < T_{e1}$ | 0 |
| $T_{e1} \leq EP_R < T_{e2}$ | LOW |
| $T_{e2} \leq EP_R < T_{e3}$ | MIDDLE |
| $T_{e3} \leq EP_R \leq 100\%$ | HIGH |

Figure 4:
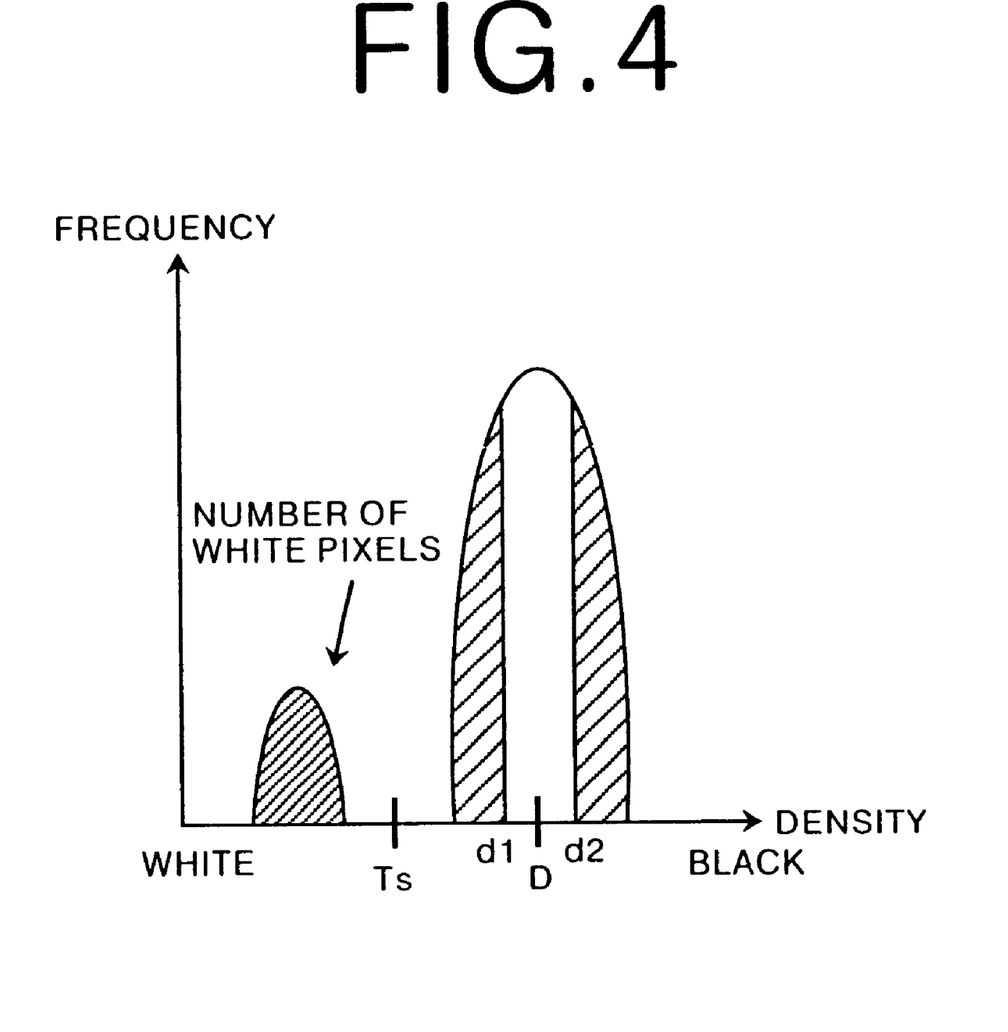
FIG. 4 is a view for illustrating the method of calculating the width and the center of the density range.

Then the histogram making section 13 makes a density histogram for each block on the basis of the density of each pixel in the block. FIG. 4 shows an example of the density histogram. The density histograms thus made are stored in the histogram memory 14.

The white pixel ratio calculating section 15 counts the number of white pixels in each block referring to the density histogram for the block, and then calculates the ratio of the number of the white pixel to the number of all the pixels in the block (M×N), i.e., the white pixel ratio $WP_R$ (%). Thereafter, the white pixel ratio calculating section 15 compares the white pixel ratio $WP_R$ for each block with first to third white pixel ratio classifying threshold values $T_{w1}$, $T_{w2}$ and $T_{w3}$ ($T_{w1}<T_{w2}<T_{w3}$), and classifies the white pixel ratio for each block into four classes, "0", "LOW", "MIDDLE" and "HIGH" according to the following table 2. The first to third white pixel ratio classifying threshold values $T_{w1}$, $T_{w2}$ and $T_{w3}$ are set so that a part of a picture which is high in density is classified into "0", a part of a picture which is intermediate in density is classified into "LOW", apart of a picture which is low in density and a thick character such as of a title is classified into "MIDDLE" and a character in a text is classified into "HIGH". The density Ts of the background may be of a preset value or may be determined on the basis of the density distribution in a predetermined region on a margin of the original.

TABLE 2

| | |
|---|---|
| $0\% \leq WP_R < T_{w1}$ | 0 |
| $T_{w1} \leq WP_R < T_{w2}$ | LOW |
| $T_{w2} \leq WP_R < T_{w3}$ | MIDDLE |
| $T_{w3} \leq WP_R \leq 100\%$ | HIGH |

Then the density center calculating section 16 calculates the center of the density range and the density range width calculating section 17 calculates the width of the density range by the use of the following approximation. When the approximation is used, the processing time can be shorter as compared with when the center of the density range is calculated by calculating the mean density of all the pixels in the block and when the density range width is calculated by calculating the standard deviation.

a. Pixels which are higher in density than the density Ts of the background are accumulated in the order in which the density becomes lower.

b. A first density d1 at which the cumulative frequency becomes ¼ of the total pixels in the block but the white pixels and a second density d2 at which the cumulative frequency becomes ¾ of the total pixels in the block but the white pixels are calculated.

c. Then the average D of the first and second densities d1 and d2 (D=(d1+d2)/2) is calculated and is taken as the center of the density range. Further, the difference d between the first and second densities d1 and d2 (d=d2−d1) is calculated and is taken as the width of the density range.

Thereafter, the density center calculating section 16 compares the calculated center D of the density range for each block with first to third density center classifying threshold values $T_{c1}$, $T_{c2}$ and $T_{c3}$ ($T_{c1}<T_{c2}<T_{c3}$), and classifies the center D of the density range for each block into four classes, "0", "LOW", "MIDDLE" and "HIGH" according to the following table 3. The first to third density center classifying threshold values $T_{c1}$, $T_{c2}$ and $T_{c3}$ are set so that a part of a picture which is low in density is classified into "0", a part of a picture which is middle in density and a character in a text are classified into "LOW", a part of a picture which is high in density and a thick character such as of a title is classified into "MIDDLE" and a solid part in a picture is classified into "HIGH".

TABLE 3

| | |
|---|---|
| 0% ≤ D < $T_{c1}$ | 0 |
| $T_{c1}$ ≤ D < $T_{c2}$ | LOW |
| $T_{c2}$ ≤ D < $T_{c3}$ | MIDDLE |
| $T_{c3}$ ≤ D ≤ 100% | HIGH |

The density range width calculating section 17 compares the calculated center width d of the density range for each block with first to third density width classifying threshold values $T_{d1}$, $T_{d2}$ and $T_{d3}$ ($T_{d1}<T_{d2}<T_{d3}$), and classifies the width d of the density range for each block into four classes, "0", "LOW", "MIDDLE" and "HIGH" according to the following table 4. The first to third density width classifying threshold values $T_{d1}$, $T_{d2}$ and $T_{d3}$ are set so that a part of a picture which is uniform in density and a thick character such as of a title are classified into "0", a part of a picture which is relatively less in tones is classified into "LOW", a part of a picture which is relatively rich in tones and a character in a text are classified into "MIDDLE" and a part of a picture which is rich in density is classified into "HIGH".

TABLE 4

| | |
|---|---|
| 0% ≤ d < $T_{d1}$ | 0 |
| $T_{d1}$ ≤ d < $T_{d2}$ | LOW |
| $T_{d2}$ ≤ d < $T_{d3}$ | MIDDLE |
| $T_{d3}$ ≤ d ≤ 100% | HIGH |

After the processing in the block characteristic value calculating section 10 is completed, the block type determining section 21 determines the type of the image in each block on the basis of the four characteristic values obtained by the block characteristic value calculating section 10 (the edge pixel ratio, the white pixel ratio, the center of the density range and the width of the density range) according to a preset LUT shown in the following table 5. The type of the image in each block may be determined by the use of a fuzzy theory in place of using an LUT. At this time, the blocks are divided into a character block (a binary image block), a picture block (a tone block) and an indeterminate image block which is difficult to determine whether it is a binary image block or a tone image block. The result of the determination is stored in the block type memory 22.

TABLE 5

| $EP_R$ | | | | $WP_R$ | | | | D | | | | d | | | | block type | | |
|---|---|---|---|---|---|---|---|---|---|---|---|---|---|---|---|---|---|---|
| 0 | L | M | H | 0 | L | M | H | 0 | L | M | H | 0 | L | M | H | ch. | ind. | pic. |
| | | ○ | | | — | | | | — | | | | — | | | ○ | | |
| | ○ | | | | | ○ | | | — | | | | — | | | ○ | | |
| ○ | | | | | ○ | | | | — | | | | ○ | ○ | | | | |
| | ○ | | | ○ | | | | | | ○ | | | — | | | | ○ | |
| ○ | | | | | | ○ | | | | | ○ | | ○ | | | | | |
| ○ | | | | | ○ | | | | | | ○ | | ○ | | | | | |
| ○ | | | | | | ○ | | | ○ | | | | ○ | | | | | |
| ○ | | | | | | ○ | | | — | | | | | ○ | | | | |
| ○ | | | | | ○ | | | | | ○ | | | ○ | | | | | |
| ○ | | | | | ○ | | | | — | | | | | ○ | | | | |
| ○ | | | | | ○ | | | | — | | | | | | ○ | | | ○ |
| ○ | | | | ○ | | | | | — | | | | — | | | | | |
| ○ | | | | | — | | | | — | | | | — | | | | | |

The LUT shown in table 5 is made according to the following rule. In table 5 and tables 6 to 10 to be described later, ○ indicates that the attribute is effective, a blank indicates that the attribute is ineffective and—indicates that the attribute is ignored.

a. As the edge pixel ratio increases, the probability that the image in the block is a character increases, and as the edge pixel ratio decreases, the probability that the image in the block is a picture increases.

b. As the white pixel ratio increases, the probability that the image in the block is a character increases, and as the white pixel ratio decreases, the probability that the image in the block is a picture increases.

c. As the center of the density range is shifted toward high, the probability that the image in the block is a character increases, and as the center of the density range is shifted toward low, the probability that the image in the block is a picture increases.

d. As the width of the density range is smaller, the probability that the image in the block is a character increases, and as the width of the density range is larger, the probability that the image in the block is a picture increases.

If necessary, the type of each block as read out from the block type memory 22 may be corrected by the block type correction section 23 referring to the result of block type determination for eight blocks adjacent to the relevant block according to the rule shown in the following table 6, and the corrected block type of the relevant block is stored in the block type memory 22. In this particular embodiment, when the type of a relevant block is determined to be an indeterminate image block and the eight blocks adjacent thereto are all binary image blocks, the block type of the relevant block is corrected to a binary image block, and to the contrast, when the type of a relevant block is determined to be an indeterminate image block and the eight blocks adjacent thereto are all tone image blocks, the block type of the relevant block is corrected to a tone image block.

TABLE 6

| type before correction | | | adjacent block types | | | type after correction | | |
|---|---|---|---|---|---|---|---|---|
| ch. | ind. | pic. | ch. | ind. | pic. | ch. | ind. | pic. |
| | ○ | | ○ | | | ○ | | |
| | ○ | | | | ○ | | | ○ |

2 Pixel-by-Pixel Determination

The pixel characteristic value calculating processing by the pixel type determining system 3 will be described next. The pixel characteristic value calculating section 30 detects three characteristic values representing the probability that the pixel is of a character (binary image) and outputs the result of the detection to the pixel type determining section 40. More specifically this processing is as follows.

That is, the edge pixel determining section 31 sets on the image signal DO stored in the line memory 7 a pixel whose type is to be determined (this pixel will be referred to as "a selected pixel", hereinbelow), and determines whether the selected pixel is an edge pixel on the basis of the value (density) of the selected pixel and the values of the eight pixels adjacent to the selected pixel in the same manner as in the edge pixel ratio calculating section 12. When it is determined that the selected pixel is an edge pixel, the edge pixel determining section 31 outputs an edge pixel detection signal. The threshold value on the basis of which whether the selected pixel is an edge pixel is determined in the edge pixel determining section 31 may be either equal to or different from the threshold value T1 used in the edge pixel ratio calculating section 12.

In this particular embodiment, the values of pixels for several main scanning lines from pixel Q to pixel P (FIG. 2) are stored in the line memory 7 so that the result of the block type determination and the result of the pixel characteristic value calculation are input into the pixel type determining section 40 at respective predetermined timings.

Figure 5A:
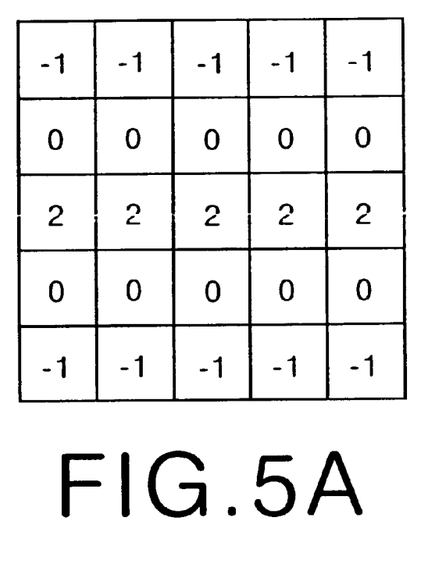
FIGS. 5A and 5B are views showing examples of thin line detecting coefficient matrices.
Figure 5B:
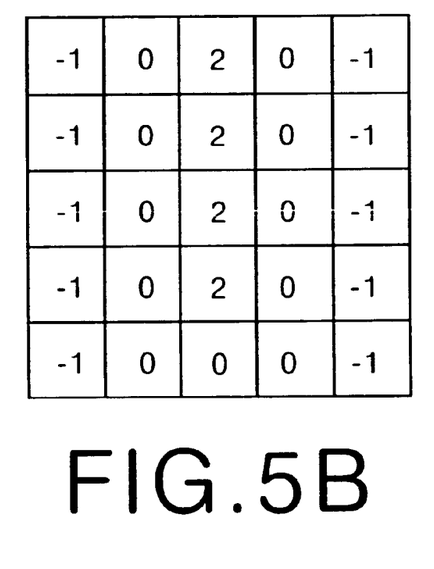

Then the thin line pixel determining section 33 carries out convolution of each 5×5 matrix comprising each selected pixel and twenty-four pixels around the selected pixel and each of a longitudinal thin line detecting coefficient matrix and a lateral thin line detecting coefficient matrix respectively shown in FIGS. 5A and 5B. When the largest of the absolute values of two values obtained by the operation for each selected pixel is not smaller than a threshold value T2 for determining a thin line pixel, the selected pixel is determined to be a thin line pixel and a thin line detection signal is output. The threshold value T2 is set so that only pixels in a thin line can be detected.

The high density pixel determining section 32 determines a selected pixel to be a high density pixel and outputs a high density pixel detection signal when the selected pixel is between a pair of edge pixels at a distance within a predetermined distance from the selected pixel and the density of the selected pixel is not lower than a threshold value T3 for high density pixel detection. The threshold value T3 has been set to be equal to a density in a black character.

The edge pixel detection signal, the thin line detection signal and the high density pixel detection signal are information on the probability that the selected pixel is of a character (a binary image). When these detection signals are output, the probability that the selected pixel is of a character is high.

3 Pixel Type Determination

Pixel type determination by the pixel type determining section 40 of the pixel type determining system 3 will be described next. The pixel type determining section 40 determines whether the selected pixel is of a character (a binary image) or a picture (a tone image) on the basis of the characteristic values of the selected pixel and the type of the block of the selected pixel according to the LUT shown in the following table 7.

TABLE 7

| type of the block | | | properties of selected pixel | | | | type of selected pixel | |
|---|---|---|---|---|---|---|---|---|
| ch. | ind. | pic. | edge | thin line | high density | others | ch. | pic. |
| ○ | | | — | | | | ○ | |
| | ○ | | | ○ | | | ○ | |
| | ○ | | | | | ○ | | ○ |
| | | ○ | | | | — | | ○ |

As shown in table 7, when a block has been determined to be a character block or a picture block, all the pixels in the block are determined to be of the same type as the block. When a block has been determined to be an indeterminate block, each pixel in the indeterminate block is determined to be of a character when at least one of the edge pixel detection signal, the thin line detection signal and the high density pixel detection signal is output, and otherwise determined to be of a picture.

Further, as can be understood from table 7, since the properties of each pixel in the block are referred only when the block is an indeterminate block, the pixel characteristic value calculation may be executed only for the pixels in the indeterminate blocks.

4 Density Conversion

Figure 6A:
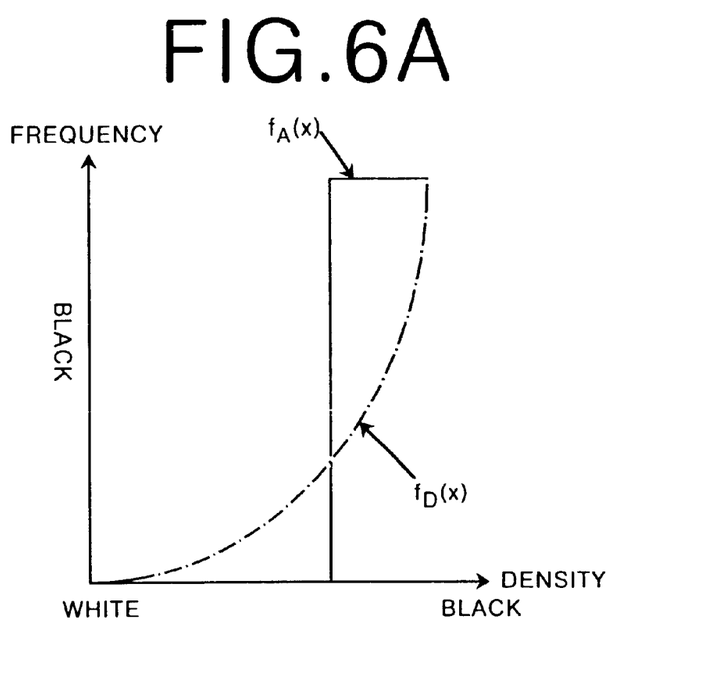
FIG. 6A is a view showing an example of the density conversion curves used in the first embodiment.

After the pixel types are thus distinguished, the density conversion curve selecting section 51 selects a density conversion curve from a plurality of density conversion curves, which have been prepared in advance, for each pixel on the basis of the type thereof. In this particular embodiment, a binary image density conversion curve $f_A(x)$ shown by the solid line in FIG. 6A and a tone image density conversion curve $f_D(x)$ shown by the chained line in FIG. 6A are prepared. The density conversion curve selecting section 51 selects the binary image density conversion curve $f_A(x)$ when the pixel is determined to be of a character and the tone image density conversion curve $f_D(x)$ when the pixel is determined to be of a picture.

Then the data conversion section 52 converts the density of each pixel input from the line memory 7 according to the density conversion curve selected for the pixel by the density conversion curve selecting section 51. Thereafter the binary-coding system 6 binary-codes the image signal (a density signal) output from the density conversion section 50 by an error diffusion method and outputs a binary image signal.

As can be understood from the description above, in the method of the first embodiment, blocks which are made up of both pixels of a character and pixels of a picture and cannot be determined to be a character block or a picture block are determined to be indeterminate blocks, and at least the pixels in the blocks determined to be an indeterminate blocks are determined to be of a character or of a picture pixel by pixel. Thus, in accordance with the first embodiment, the types of pixels in the blocks in which binary images and tone images mingle together and which cannot be simply determined to be a binary image block or a tone image block by the "block-by-block" determination can be precisely determined. Further since each block is larger than the visually distinguishable size, whether an image in each block is a part of a thick character or a high density portion of a picture can be readily determined.

Thus in accordance with the first embodiment of the present invention, the binary image region and the tone image region can be more precisely distinguished from each other, and accordingly, when the image signal is subjected to density conversion, the density of each pixel can be more adequately converted and an image free from the drawbacks inherent to the conventional method, that is, densities of pixels are output to be higher or lower than a correct density due to wrong determination, and a density step is generated between a part correctly determined and a part incorrectly determined, which makes the observer to feel strange.

An operation of the image processing apparatus 1 for carrying out a method in accordance with a second embodiment of the present invention will be described, hereinbelow. The method in accordance with the second embodiment of the present invention differs from the first embodiment in the processing by the block type determining section 21 and the processing by the pixel type determining section 40.

1 Block-by-Block Determination

The processing up to the processing in the block characteristic value calculating section 10 is the same as in the first embodiment. After the processing in the block characteristic value calculating section 10 is completed, the block type determining section 21 determines the type of the image in each block on the basis of the four characteristic values obtained by the block characteristic value calculating section 10 (the edge pixel ratio, the white pixel ratio, the center of the density range and the width of the density range) according to a preset LUT shown in the following table 8. The type of the image in each block may be determined by the use of a fuzzy theory in place of using an LUT. At this time, the blocks are divided into a character block (a binary image block), a picture block (a tone block) and an indeterminate image block which is difficult to determine whether it is a binary image block or a tone image block. The indeterminate image blocks are further classified into a character-ward image block (a block the image in which is inclined toward a character) and a picture-ward block (a block the image in which is inclined toward a picture). The result of the determination is stored in the block type memory 22.

TABLE 8

| $EP_R$ | | | | $WP_R$ | | | | D | | | | d | | | | block type | | | |
|---|---|---|---|---|---|---|---|---|---|---|---|---|---|---|---|---|---|---|---|
| | | | | | | | | | | | | | | | | | ind. | | |
| 0 | L | M | H | 0 | L | M | H | 0 | L | M | H | 0 | L | M | H | ch. | c-w | p-w | pic. |
|   | o |   |   |   |   | o |   | — |   |   |   | — |   |   |   | o |   |   |   |
|   | o |   |   |   | o |   |   |   | o |   |   |   |   | o | o |   |   |   |   |
|   | o |   |   |   | o |   |   |   |   | o |   | — |   |   |   |   |   | o |   |
|   | o |   |   |   |   |   |   |   |   | o |   | — |   |   |   |   |   |   |   |
|   | o |   |   |   |   | o |   |   |   |   | o | o |   |   |   |   |   |   |   |
|   | o |   |   |   | o |   |   |   |   |   | o | o |   |   |   |   |   |   |   |
|   | o |   |   |   |   | o |   | o |   |   |   |   | o |   |   |   |   |   | o |
|   | o |   |   |   | o |   |   | — |   |   |   |   |   | o |   |   |   |   |   |
|   | o |   |   |   | o |   |   | o |   |   |   |   | o |   |   |   |   |   |   |
|   | o |   |   |   | o |   |   | — |   |   |   |   | o |   |   |   |   |   |   |
|   | o |   |   |   | o |   |   | — |   |   |   |   |   |   | o |   |   | o |   |
|   | o |   |   |   |   | o |   | — |   |   |   | — |   |   |   |   |   |   |   |
| o |   |   |   | — |   |   |   | — |   |   |   | — |   |   |   |   |   |   |   |

If necessary, the type of each block as read out from the block type memory 22 may be corrected by the block type correction section 23 referring to the result of block type determination for eight blocks adjacent to the relevant block according to the rule shown in the following table 9, and the corrected block type of the relevant block is stored in the block type memory 22. In this particular embodiment, when the type of a relevant block is determined to be a character-ward (c-w) image block and the eight blocks adjacent thereto are all character and/or character-ward image blocks, the block type of the relevant block is corrected to a character image block, and to the contrast, when the type of a relevant block is determined to be a picture-ward (p-w) image block and the eight blocks adjacent thereto are all picture and/or picture-ward image blocks, the block type of the relevant block is corrected to a picture image block.

TABLE 9

| type before correction | | | | adjacent block types | | | | type after correction | | | |
|---|---|---|---|---|---|---|---|---|---|---|---|
| ind. | | | | ind. | | | | ind. | | | |
| ch. | c-w | p-w | pic. | ch. | c-w | p-w | pic. | ch. | c-w | p-w | pic. |
|  | o |  |  | o |  |  |  | o |  |  |  |
|  |  | o |  |  |  |  | o |  |  |  | o |

2 Pixel-by-Pixel Determination

This processing is similar to (2) Pixel-by-Pixel Determination in the first embodiment.

Since the threshold value T1 for determining an edge pixel is set so that only an edge which hardly appears in a tone image can be detected, it is normally possible to distinguish an edge portion of a character from a part of a picture which is like an edge. However, depending on a type of image, convolution involving a part of a picture which is like an edge can result in a value not smaller than the threshold value T1. In such a case, even for a pixel of a part of a picture which is like an edge, an edge pixel detection signal can be output. Conversely when the threshold value T1 for determining an edge pixel is set so that an edge pixel detection signal cannot be output for a pixel of a part picture which is like an edge, the edge pixel detection signal is not sometimes output even for a pixel of an edge of a character.

In a determination whether the selected pixel is a high density pixel, since the threshold value T3 for high density pixel detection is set to be equal to a density in a black character, it is normally possible to distinguish an thick character from a high density part of a picture. However, depending on a type of image, the density of a high density part of a picture can be not higher than the density in a black character, i.e., the threshold value T3 for high density pixel detection. In such a case, even for a pixel of a high density part of a picture, a high density pixel detection signal representing a possibility that the pixel is of a character can be output. Conversely when the threshold value T3 for determining a high density pixel is set so that a high density pixel detection signal cannot be output for a pixel of a high density part of a picture, the high density pixel detection signal is not sometimes output even for a pixel of a thick character.

Thus, it is difficult to precisely distinguish from each other a pixel of an edge of a character and a pixel of a part of a picture which is like an edge or a pixel of a part of a thick character and a pixel of a high density part of a picture. For example, a case where a pixel for which no information representing that it is of a character is output is actually a pixel of a character can occur, and a case where a pixel for which information representing that it is of a character is output is actually a pixel of a picture can occur.

Further, in the pixel characteristic value calculating section 30, characteristic values which represent the probability that the pixel is of a character are only calculated and pixels which cannot be determined to be of a character on the basis of the characteristic values detected must be taken as a pixel of a picture. However, in pixels which are determined to be of a picture, those which are relatively inclined toward a character and those which are relatively inclined toward a picture can be included.

When a density conversion is carried out by use of the density conversion curve exclusive to the tone image on pixels which are determined to be of a picture though actually of a character, the pixels are output to be lower in density as compared with when a density conversion is carried out by use of the density conversion curve adequate to the binary image. Conversely when a density conversion is carried out by use of the density conversion curve exclusive to the binary image on pixels which are determined to be of a character though actually of a picture, the pixels are output to be higher in density as compared with when a density conversion is carried out by use of the density conversion curve adequate to the tone image. If the densities of pixels are output to be higher or lower than a correct density due to wrong determination, a density step is generated between a part of the character pixels of which are incorrectly determined to be of a picture and a part of a thick character pixels of which are correctly determined to be of a character and between a part of a picture like an edge pixels of which are incorrectly determined to be of a character and apart of the picture pixels of which are correctly determined to be of a picture. The following pixel type determination in this embodiment lowers this problem.

3 Pixel Type Determination

The pixel type determination in the second embodiment is for reducing the density step generated when pixels which are actually of a character are incorrectly determined to be of a picture or when pixels which are actually of a picture are incorrectly determined to be of a character.

In the second embodiment, the pixel type determining section 40 classifies the selected pixels into four types, a character (a binary image) type, a picture (a tone image) type, a character-ward type and a picture-ward type on the basis of the characteristic values of the selected pixel and the type of the block of the selected pixel according to the LUT shown in the following table 10.

TABLE 10

| type of the block | | | | properties of selected pixel | | | | type of selected pixel | | | |
|---|---|---|---|---|---|---|---|---|---|---|---|
| ind. | | | | thin | high | | | ind. | | | |
| ch. | c-w | p-w | pic. | edge | line | density | others | ch. | c-w | p-w | pic. |
| o | | | | — | | | | o | | | |
| | o | | | o | | | | | o | | |
| | o | | | | | | o | | | o | |
| | | o | | | | | o | | o | | |
| | | o | | | | | | | | o | |
| | | | o | — | | | | | | | o |

As shown in table 10, when a block has been determined to be a character block or a picture block, all the pixels in the block are determined to be of the same type as the block. When a block has been determined to be a character-ward image block or a picture-ward image block, each pixel in the block is determined to be of the character-ward type when at least one of the edge pixel detection signal, the thin line detection signal and the high density pixel detection signal is output, and otherwise determined to be of the picture-ward type.

Further, as can be understood from table 10, since the properties of each pixel in the block are referred only when the block is an indeterminate block, the pixel characteristic value calculation may be executed only for the pixels in the indeterminate blocks.

4 Density Conversion

Figure 6B:
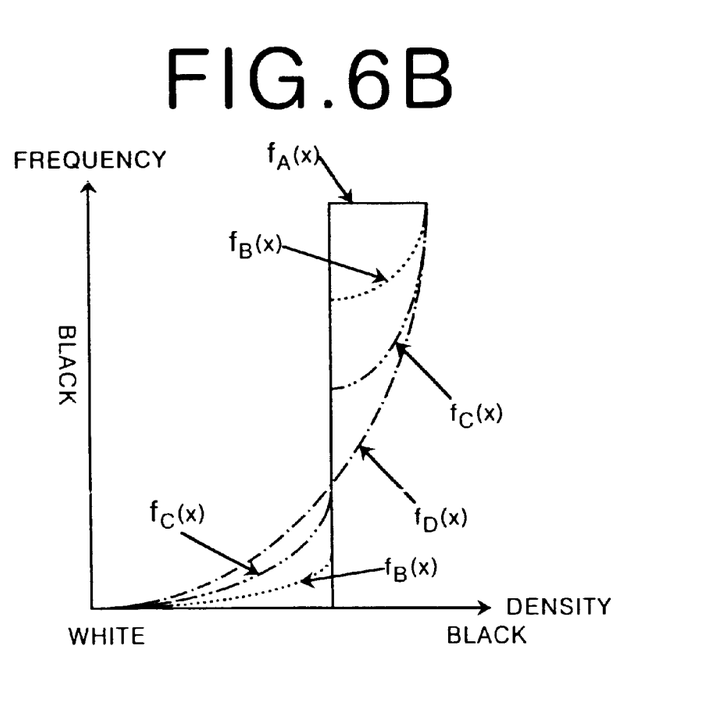
FIG. 6B is a view showing an example of the density conversion curves used in the second embodiment.

After the pixel types are thus distinguished, the density conversion curve selecting section 51 selects a density conversion curve from a plurality of density conversion curves, which have been prepared in advance, for each pixel on the basis of the type thereof. Unlike in the first embodiment where only two density conversion curves are prepared, in the second embodiment, four density conversion curves are prepared. That is, in addition to a binary image density conversion curve $f_A(x)$ shown by the solid line in FIG. 6B and a tone image density conversion curve $f_D(x)$ shown by the one-dot chained line in FIG. 6B, a binary image-ward density conversion curve $f_B(x)$ shown by the dotted line in FIG. 6B and a tone image-ward density conversion curve $f_C(x)$ shown by the two-dot chained line in FIG. 6B which interpolate between the two density conversion curves are prepared. The density conversion curve selecting section 51 selects the binary image density conversion curve $f_A(x)$ when the pixel is determined to be of a character, the binary image-ward density conversion curve $f_B(x)$ when the pixel is determined to be of the character-ward type, the tone image-ward density conversion curve $f_C(x)$ when the pixel is determined to be of the picture-ward type and the tone image density conversion curve $f_D(x)$ when the pixel is determined to be of a picture.

Then the data conversion section 52 converts the density of each pixel input from the line memory 7 according to the density conversion curve selected for the pixel by the density conversion curve selecting section 51. Thereafter the binary-coding system 6 binary-codes the image signal (a density signal) output from the density conversion section 50 by an error diffusion method and outputs a binary image signal.

As can be understood from the description above, in the method of the second embodiment, even if wrong determination occurs due to coexistence of pixels of a thick character and pixels of a high density part of a picture or pixels of an edge portion of a character and pixels of a part of a picture like an edge in one block, the density step generated due to the wrong determination can be lowered.

An operation of the image processing apparatus 1 for carrying out a method in accordance with a third embodiment of the present invention will be described, hereinbelow. The method in accordance with the third embodiment of the present invention differs from the second embodiment in the processing when a selected pixel is determined to be of a picture type or of a picture-ward type.

Figure 7:
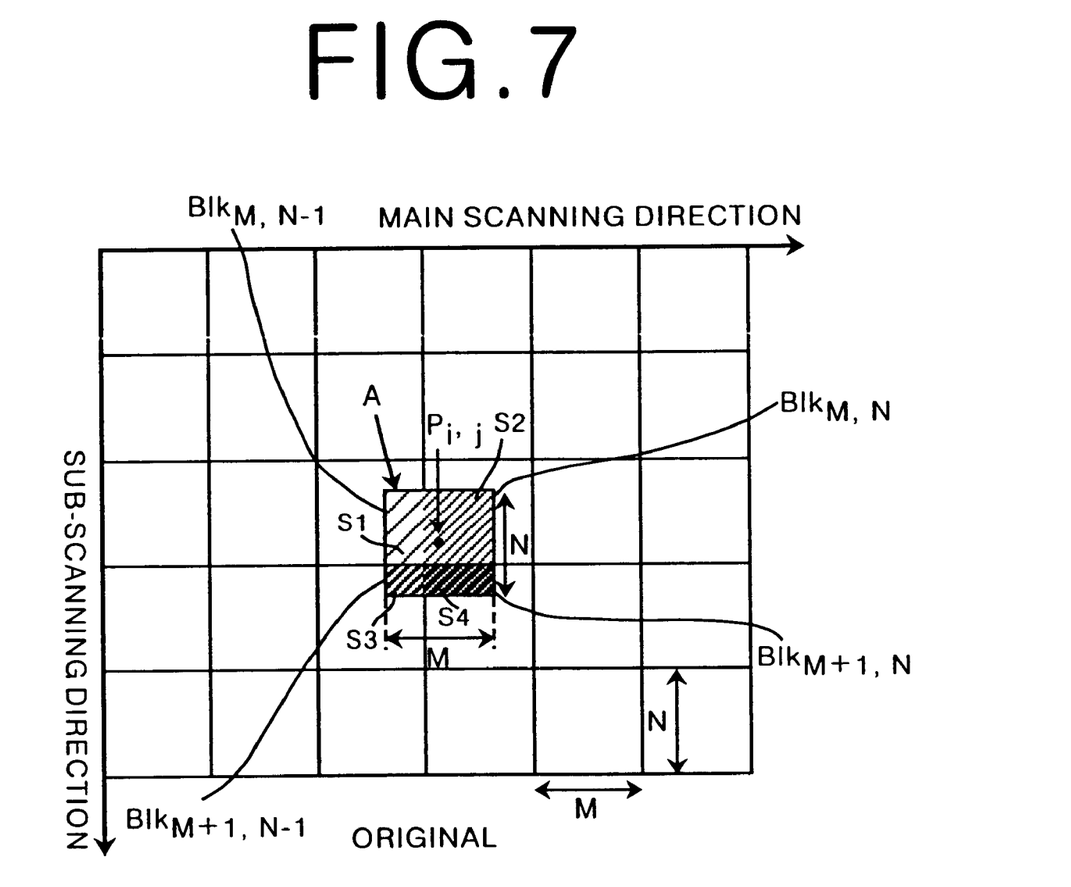
FIG. 7 is a view for illustrating a method of density interpolation.

The data conversion section 52 converts the density of each of pixels which are determined to be of a character type or of a character-ward type according to the density conversion curve $f_A(x)$ or $f_B(x)$, and carries out density interpolation on each of pixels which are determined to be of a picture type or of a picture-ward type in the following manner.

a. As shown in FIG. 7, a secondary block A whose center is on a selected pixel $P_{i,j}$ (● in FIG. 7) is set. In this embodiment, the secondary block A is of the same size as the blocks described in the first embodiment and includes M×N pixels though need not be of the same size as the blocks described in the first embodiment.

b. The original density d (before interpolation) of the selected pixel is corrected to a density d' by density interpolation according to the following formula (1).

$$d' = \{S1 \times f_c(d) + S2 \times f_D(d) + S3 \times f_D(d) + S4 \times f_c(d)\}/(M \times N) \ldots \quad (1)$$

wherein S1, S2, S3 and S4 respectively represent the areas of the parts of the blocks $Blk_{m, N-1}$, $Blk_{M, N}$, $Blk_{M+1, N-1}$, $Blk_{M+1, N}$ overlapping the secondary block A assuming that density conversion curve $f_c(x)$ is selected for the blocks $Blk_{M, N-1}$ and $Blk_{M+1, N}$ and density conversion curve $f_D(x)$ is selected for the blocks $Blk_{M, N}$ and $Blk_{m+1, N-1}$.

By carrying out density interpolation in this manner when pixels in an indeterminate block are determined to be of a picture type or of a picture-ward type, the density of the border between a binary image region and a tone image region can be smoothly continued, whereby a phenomenon that a shape of the block appears on the border between a binary image region and a tone image region can be suppressed.

Though preferred embodiments of the present invention have been described, the present invention need not be limited to the embodiments described above.

For example, though, in the embodiments described above, each block is set in size of 1 cm×1 cm on the original. When the block is set larger, pixels of a part of a thick character and those of a high density part of a picture can be more precisely distinguished from each other and pixels of an edge of a character and those of apart of a picture like an edge can be more precisely distinguished from each other.

Further, the size of the edge detecting coefficient matrix and/or the thin line detecting coefficient matrix may be changed or increased in order to improve the edge detecting accuracy and/or the thin line detecting accuracy.

Further, though, in the second embodiment, the image level between the binary image and the tone image is divided into two levels, a character-ward level and a picture-ward level, the image level may be divided into three or more levels. For example, "an intermediate level" may be added between the character-ward level and picture-ward level.

The method and apparatus of the present invention may be used for various purposes not limited to density conversion.

What is claimed is:

1. A method of distinguishing the types of pixels of an image made up of a plurality of pixels arranged in a main scanning direction and a sub-scanning direction comprising the steps of;

carrying out a block-by-block determination in which the image is divided into a plurality of blocks each substantially larger than a visually distinguishable size, properties of the images in the blocks representing the probability that the image is a binary image are detected, probability that the image in each block is a binary image is determined on the basis of the detected properties of the image in the block, each block is determined to be a binary image block when the probability is higher than a first predetermined value, to be a tone image block when the probability is lower than a second predetermined value, and to be an indeterminate image block when the probability is not higher than the first predetermined value and not lower than the second predetermined value, and the pixels in the blocks which are determined to be a binary image block are all determined to be pixels of a binary image while the pixels in the blocks which are determined to be a tone image block are all determined to be pixels of a tone image, and carrying out a pixel-by-pixel determination on the blocks, which are determined to be an indeterminate image block by the block-by-block determination, in which properties of each of the pixels in each of the indeterminate blocks representing the probability that the pixel is of a binary image are detected, and whether the pixel is a pixel of a binary image is determined on the basis of the detected properties.

2. A method as defined in claim 1 in which
   on which level between the tone image and the binary image each of the blocks which are determined to be an indeterminate image block is determined on the basis of said properties of the image in the block representing the probability that the image is a binary image and
   each of the pixels in the block which are not determined to be of a binary image out of the pixels in the blocks which are determined to be an indeterminate image block is considered to be on the image level equal to the image level of the block.

3. A method as defined in claim 1 in which
   on which level between the tone image and the binary image each of the pixels in the block which are not determined to be of a binary image out of the pixels in the blocks which are determined to be an indeterminate image block is determined on the basis of properties of the pixel representing the probability that the pixel is of a binary image.

4. An apparatus for distinguishing the types of pixels of an image made up of a plurality of pixels arranged in a main scanning direction and a sub-scanning direction comprising
   a block-by-block determination means which carries out a block-by-block determination in which the image is divided into a plurality of blocks each substantially larger than a visually distinguishable size, properties of the images in the blocks representing the probability that the image is a binary image are detected, probability that the image in each block is a binary image is determined on the basis of the detected properties of the image in the block, each block is determined to be a binary image block when the probability is higher than a first predetermined value, to be a tone image block when the probability is lower than a second predetermined value, and to be an indeterminate image block when the probability is not higher than the first predetermined value and not lower than the second predetermined value, and the pixels in the blocks which are determined to be a binary image block are all determined to be pixels of a binary image while the pixels in the blocks which are determined to be a tone image block are all determined to be pixels of a tone image, and
   a pixel-by-pixel determination means which carries out a pixel-by-pixel determination on the blocks, which are determined to be an indeterminate image block by the block-by-block determination, in which properties of each of the pixels in each of the indeterminate blocks representing the probability that the pixel is of a binary image are detected, and whether the pixel is a pixel of a binary image is determined on the basis of the detected properties.

5. An apparatus as defined in claim 4 in which
   the block-by-block determination means determines on which image level between the tone image and the binary image each of the blocks which are determined to be an indeterminate image block is on the basis of said properties of the image in the block representing the probability that the image is a binary image, and
   the pixel-by-pixel determination means determines each of the pixels in the block which are not determined to be of a binary image out of the pixels in the blocks which are determined to be an indeterminate image block to be on the image level equal to the image level of the block.

6. An apparatus as defined in claim 4 in which the pixel-by-pixel determination means determines on which level between the tone image and the binary image each of the pixels in the block which are not determined to be of a binary image out of the pixels in the blocks which are determined to be an indeterminate image block is on the basis of properties of the pixel representing the probability that the pixel is of a binary image.

* * * * *